United States Patent [19]

Miller

[11] 4,002,962
[45] Jan. 11, 1977

[54] PHASE LOCKED SERVO LOOP CIRCUIT

[75] Inventor: Samuel A. Miller, China Lake, Calif.

[73] Assignee: The United States of America as represented by the Secretary of the Navy, Washington, D.C.

[22] Filed: Oct. 1, 1973

[21] Appl. No.: 402,220

[52] U.S. Cl. .............................. 318/329; 318/314
[51] Int. Cl.² .................. G05B 5/00; H02K 27/70; H02P 5/08
[58] Field of Search .................. 318/314, 318, 329

[56] References Cited

UNITED STATES PATENTS

| 3,154,730 | 10/1964 | Houldin | 318/318 |
|---|---|---|---|
| 3,295,039 | 12/1966 | MacDonald | 318/314 |
| 3,386,021 | 5/1968 | Fischer | 318/329 |
| 3,500,160 | 3/1970 | Sommer | 318/318 |

*Primary Examiner*—James R. Scott
*Assistant Examiner*—John J. Feldhaus
*Attorney, Agent, or Firm*—R. S. Sciascia; Roy Miller

[57] ABSTRACT

Described herein is a phase locked servo loop circuit which causes a DC motor to operate synchronously regardless of DC motor load. The circuit comprises a pick-off device which generates an integral number of voltage pulses each time the motor rotates through 360° and a clock pulse generator that provides fixed frequency pulses. The output pulse of the pick-off device is applied to the input of a logic circuit which either opens or closes a switch in response to phase differences between the train of pick off pulses and the train of clock pulses to control the speed of the motor.

4 Claims, 13 Drawing Figures

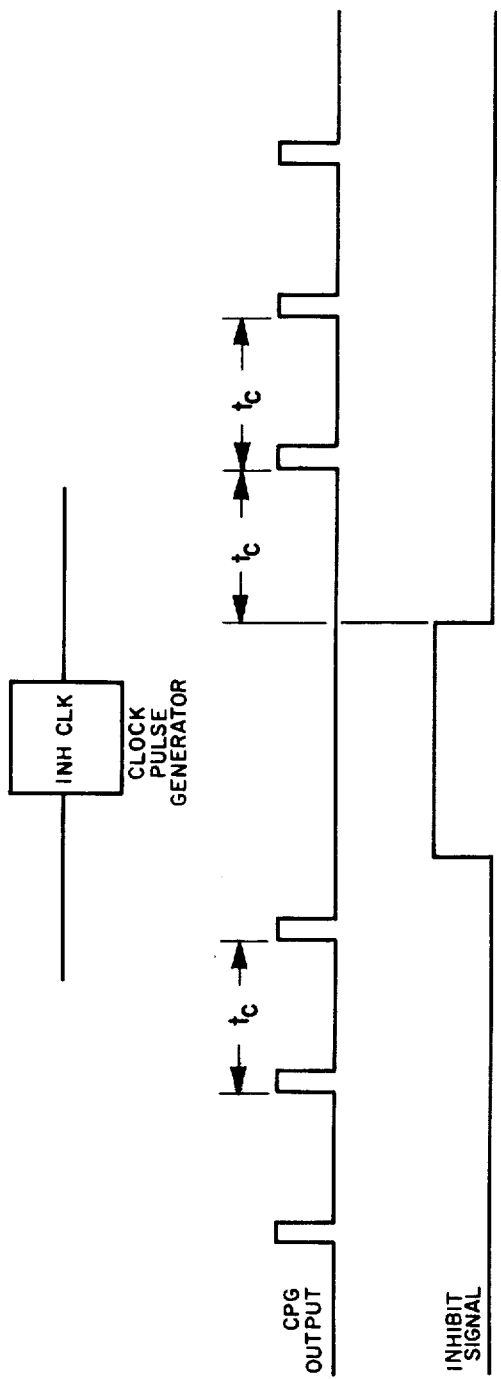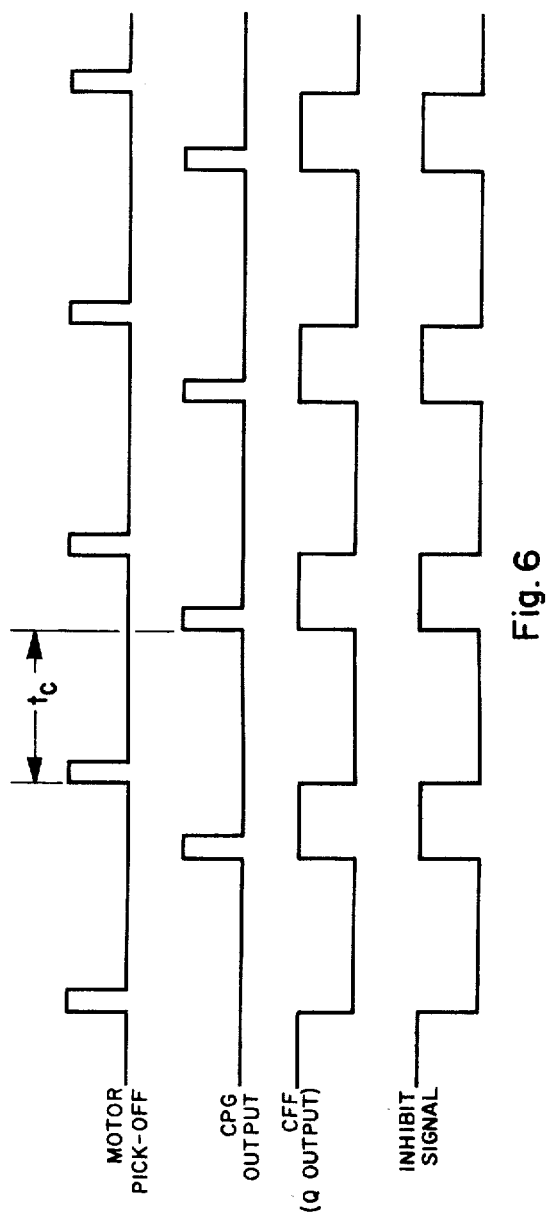

PHASE LOCKED SERVO LOOP CIRCUIT

BACKGROUND OF THE INVENTION

This invention relates to circuitry for motor control and more particularly to a motor control circuit which will cause a DC motor to run in much the same manner as a synchronous motor.

A synschronous motor is one which will run at a constant speed regardless of the load torque requirements. This is true synchronous up to a certain point, however, and when load torque requirements exceed the capability of the motor, it drops out of synchronization and begins to slow down. Synchronous motors are used in devices which must run at constant speeds such as clocks, tape recorders, and the like. There is a class of alternating current (AC) motors which inherently operate synchronously and such motors require no external circuitry to achieve synchronous operation. However such motors require an AC source for operation, and sometimes only a DC source is available. A DC motor will not operate synchronously without some external circuitry to detect its speed and vary the current to the motor accordingly. According to the present invention a circuit is provided which causes a DC motor to operate synchronously.

BRIEF DESCRIPTION OF THE SEVERAL VIEWS OF THE DRAWING

FIG. 5 is a graphical representation of the output of the Clock Pulse Generator of FIG. 4;

FIG. 6 is a graphical representation of various signals within the circuit when the motor is running at less than synchronous speed;

DESCRIPTION AND OPERATION

Figure 1:
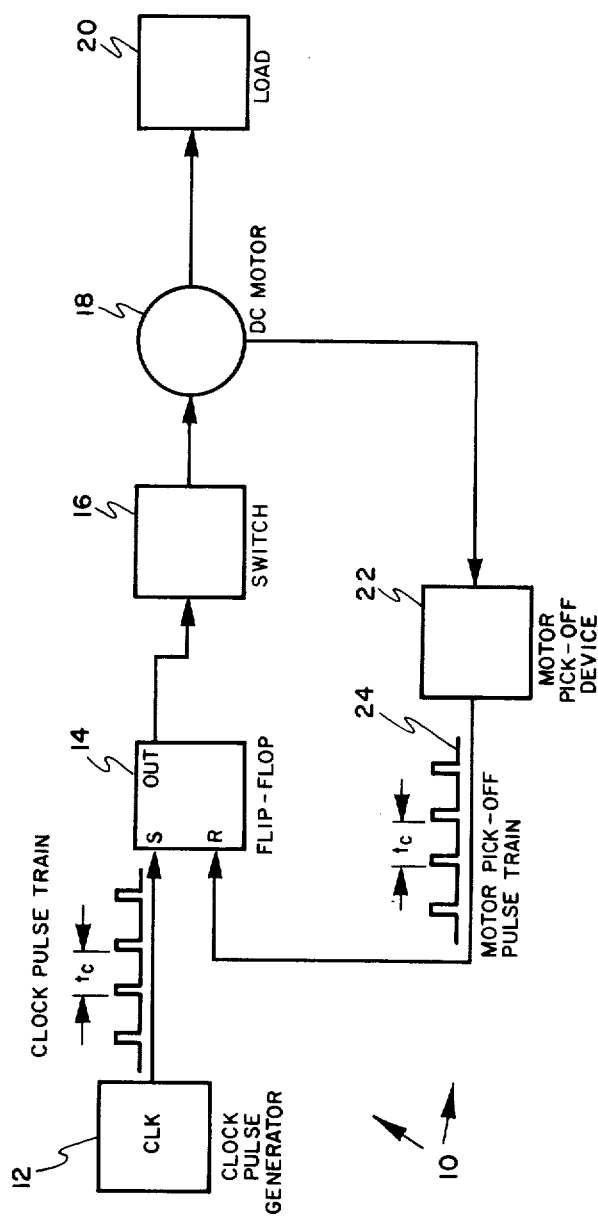
FIG. 1 is a simplified circuit diagram of a phase locked servo loop motor control system according to the invention.
Figure 2A:
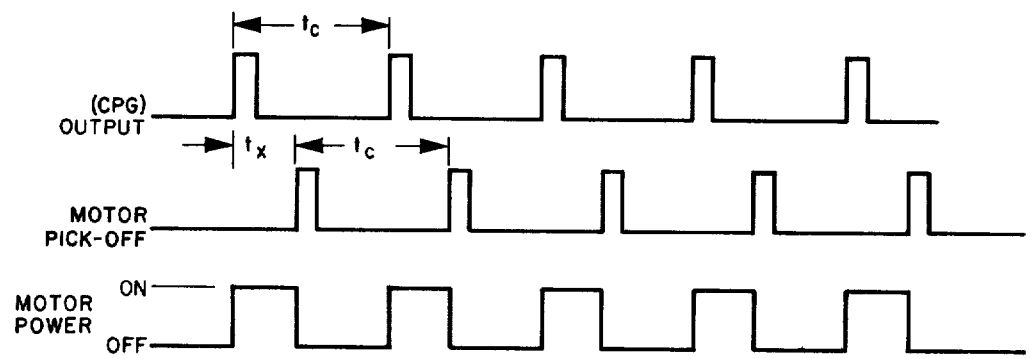
FIGS. 2A, 2B and 2C are graphical representations of certain circuit parameters of units of FIG. 1 under varying motor load conditions.
Figure 2B:
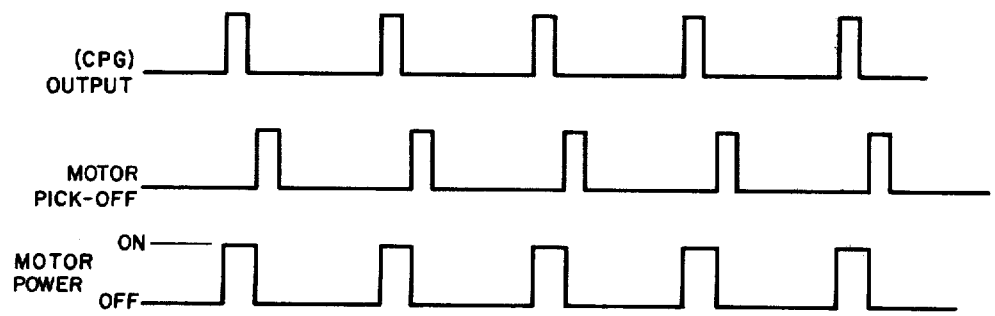
Figure 2C:
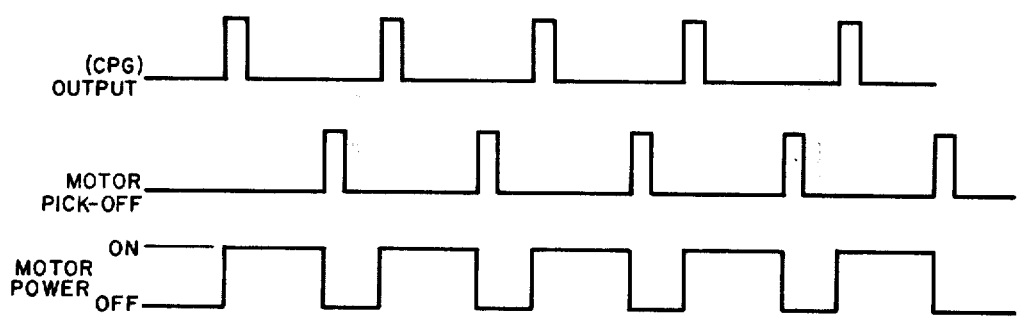

The circuit 10 shown in FIG. 1, falls into a broad catagory of devices called phase locked servo loops. For the purpose of considering the principles of such a loop, let us assume that the motor 18 is running at the synchronous speed so that its rotational frequency is $f_s$. Coupled with a rotating element of the motor is a pick-off device 22 which generates one voltage pulse every time the motor rotates through 360 degrees. The output of this pick-off device is then a train of voltage pulses 24 spaced in time by an interval of $t_c$, where $t_c = 1/f_s$. These pulses from the motor pick-off are applied to the *reset* input of a *set-reset* flip-flop or bistable multivibrator 14. This flip-flop 14 either opens or closes a switch 16 which controls the power to the motor 18, depending on whether the flip-flop is in its *set* or *reset* condition. Therefore, each pulse from the motor pick-off device 22 causes flip-flop 14 to be reset and the power to the motor to be interrupted. The *set* input of flip-flop 14 is activated by a train of pulses from a clock pulse generator (CPG) 12. The CPG 12 also generates pulses at a constant repetition rate shown as $t_c$. For some arbitrary load 20, the relationship between the CPG output, the motor pick-off output and the current being supplied to the motor may look as it does in FIG. 2A. The motor power switch 16 is closed, applying current to the motor 18, at the leading edge of each clock pulse, and that it is opened at the leading edge of each motor pick-off pulse. The average current supplied to the motor 18 over a given time will be proportional to the ratio of $t_x/t_c$. This ratio is dependent on the relative displacement or phase difference between the train of clock pulses and those produced by the motor pick-off 22. If the load torque is suddenly decreased the motor speeds up transiently causing the phase difference between the two pulse trains to decrease. This causes the average current to the motor to be reduced which, in turn, causes the torque output of the motor to be reduced. Eventually the motor settles back down to the synchronous speed with the phase difference between the two pulse trains somewhat less, as in FIG. 2B. If the load torque is then suddenly increased again, just the opposite happens. The motor slows down transiently, the phase difference increases, average motor current increases, motor torque output increases just balancing the load, and the motor settles back down to the synchronous speed. This situation is shown in FIG. 2C. The important thing in these illustrations is that the motor always comes back to the synchronous speed regardless of the different load torque requirements.

Figure 3A:
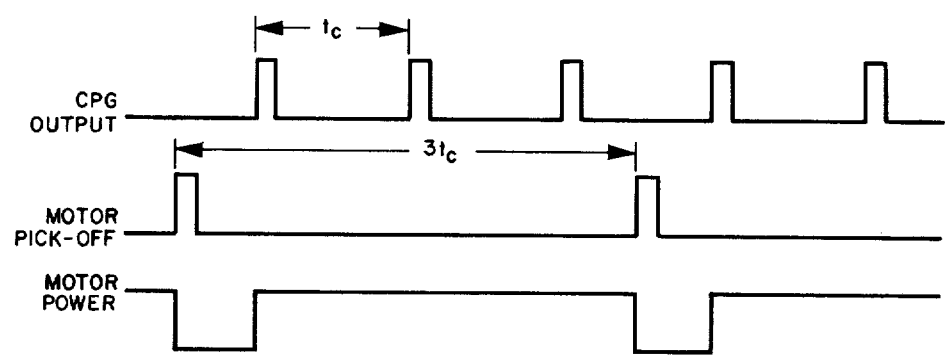
FIGS. 3A and 3B are graphical representations similar to FIGS. 2A, 2B and 2C showing the motor locked into the third subharmonic and third harmonic of synchronous speed respectively.

The simplified circuit just described has some disadvantages when used as a practical motor speed control. There are no provisions, for example, for bringing the motor up to the synchronous speed from a dead stop. Furthermore, the motor speed may become locked into any number of harmonics or subharmonics of the synchronous speed, depending on the torque requirements of the load 20, and the torque available from the motor at those speeds. For example, consider pulse waveforms of FIG. 3A. Here the motor is shown locked into the third subharmonic of the synchronous speed. (the $n^{th}$ subharmonic is defined as $f_s/n$.) If the torque required by the load is greater than two thirds of the maximum torque available from the motor at that speed then the motor will ramain locked in at that speed. In general, the motor can be locked into any subharmonic if $$T_{max} > T_L > \frac{n-1}{n} T_{max}$$

where $T_L$ is the torque required by the load at the $n^{th}$ subharmonic;

$T_{max}$ is the maximum torque available from the motor at the $n^{th}$ subharmonic.

Figure 3B:
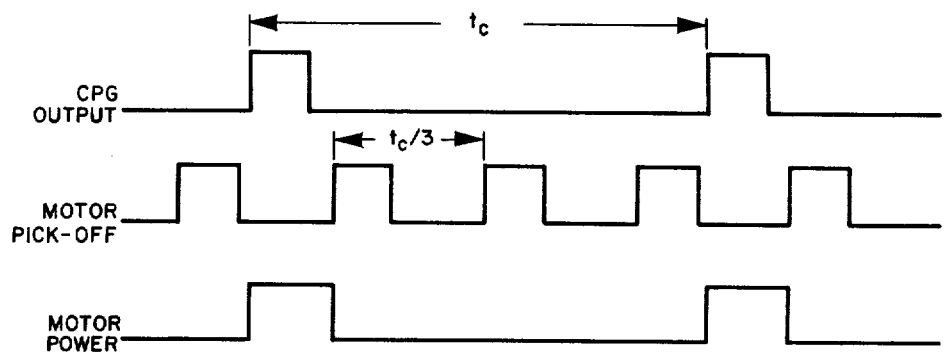

FIG. 3B shows the motor locked into the third harmonic of the synchronous speed, and it will remain locked into this speed until the torque required by the load exceeds one third of that available from the motor at that speed. In general, for harmonics of the synchronous speed (the $n^{th}$ harmonic is defined as $nf_s$) the motor speed can lock in if $$0 < T_L < T_{max}/n$$

Therefore, there is a need for circuitry which allows the motor to operate only at the synchronous speed.

Figure 4:
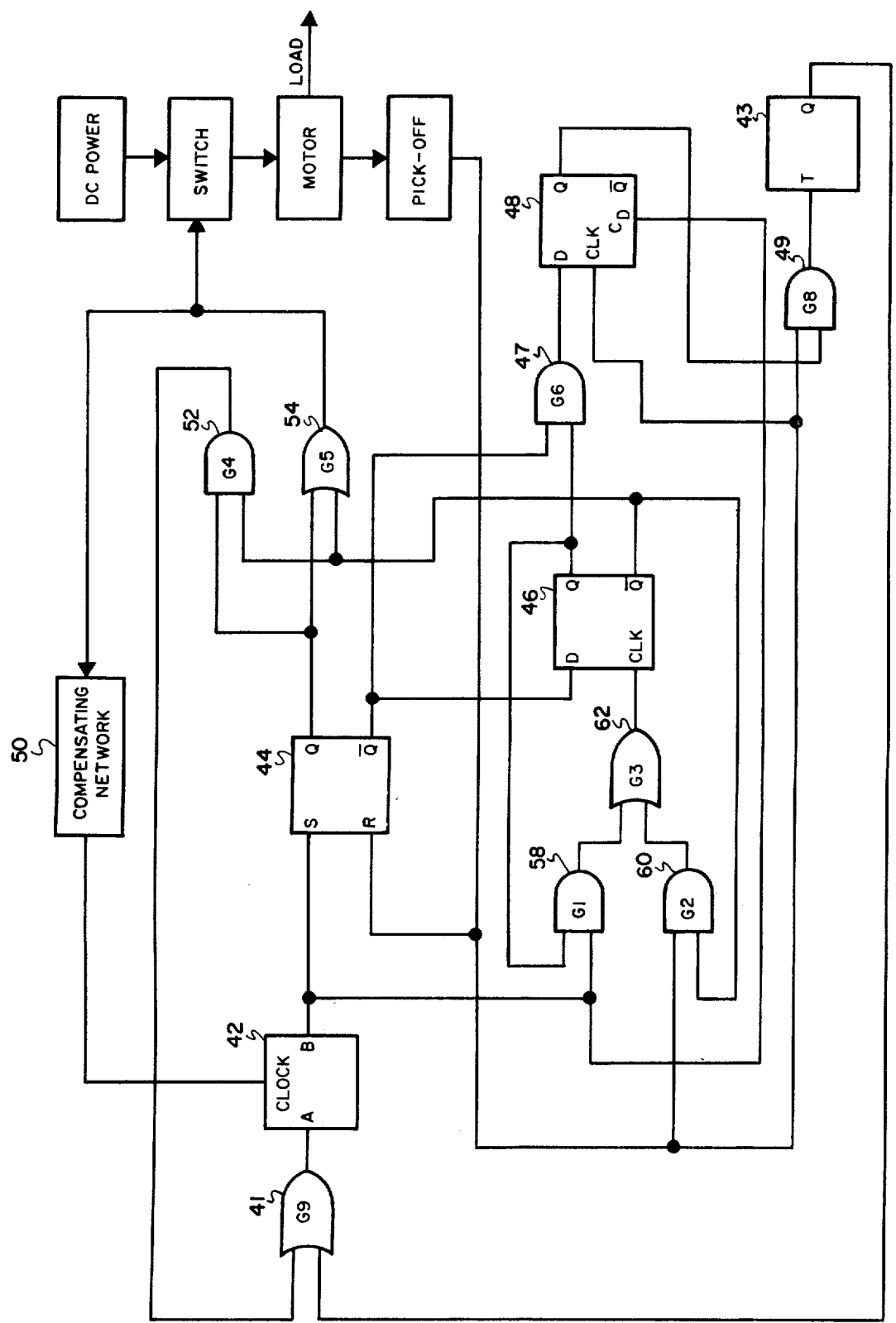
FIG. 4 is a functional logic diagram of the motor circuit according to the invention.

FIG. 4 is a functional logic diagram of a circuit according to the invention which permits only synchronous operation. The circuit consist of a clock pulse generator 42, three bistable multivibrators or flip-flops 44, 46, 48 respectively logic gates G1–G8, an astable multivibrator or overspeed one shot 43 and a loop compensator network 50. The compensator network 50 is necessary in the operation of the loop to insure that the loop will remain stable.

Clock pulse generator 42 has a clock output terminal (b) and an inhibit terminal (A). When the inhibit is a logic ZERO, clock pulses emanate from the clock terminal B at a fixed pulse frequency. When the inhibit is a logic ONE, the clock is inhibited and no pulses appear at the output. The CPG will begin generating output pulses again exactly at time interval $t_c$ after the inhibit signal changes from ONE to ZERO (see FIG. 5).

The control flip-flop 44 is a *set-reset* flip-flop with complementary outputs Q and $\overline{Q}$. Q is *set* to a logic ONE at the positive going edge of each clock pulse, and is *reset* to a ZERO at the positive going edge of each motor pick-off pulse.

The synchronous detector flip-flop 46 and the overspeed detector flip-flop 48, are type D flip-flops, also with complementary outputs. The output of these flip-flops will change only at the positive going edge of the input labeled CLK. If the Data input (D) is a logic ONE during this transistion, the output (Q) will go to or remain at ONE. If the D input is a ZERO, then the output Q will change to, or remain at ZERO.

In addition, the overspeed flip-flop 48 (OSFF) has a direct clear ($C_D$) input. When this input is at ONE, the other two inputs (D and CLK) are overridden and the OSFF 48 is held in the reset condition (Q = ZERO, $\overline{Q}$ = ONE).

Referring now to the timing diagrams of FIGS. 6, 7, 8, 9 and 10 in order to discuss how this circuit detects synchronous speed, overspeed and underspeed.

FIG. 6 shows various signals around the circuit when the motor is running at less than synchronous speed. Assume initially that the synchronous detector flip-flop 46 and the over speed detector flip-flop 48 are set (Q = ZERO, $\overline{Q}$ = ONE). The first motor pick-off pulse causes the CFF 44 to be reset, and the next clock generated pulse which occurs at a time $t_c$ later causes CFF 44 to be *set* again. The clock pulse generator is inhibited at this time by a coincidence of pulses at the AND gate G4 the output of which passes OR Gate 9 (see FIG. 4). The next time a motor pick-off pulse arrives, the CFF 44 is *reset* and the inhibit signal to the CPG 42 is removed. This causes a clock pulse to be emitted at a time $t_c$ later which *sets* the CFF 44, inhibiting the CPG 42. This cycle will repeat itself as long as the interval between succeeding motor pick-off pulses is greater than $t_c$. The synchronous detector flip-flop 46 is clocked by the motor pick-off pulse train through AND gate G2 and OR gate G3 during this underspeed cycle. Flip-flop 46 will remain reset during this condition because its D input will always be ZERO whenever the signal on its clock input transfers from ZERO to ONE.

The motor control signal at the output of G5 is held in a ONE state by the $\overline{Q}$ output of flip-flop 46. This motor control signal applies full power to the motor causing it to speed up until the synchronous speed is reached. Thus all *subharmonic* speeds are bypassed without the possibility of locking in on them.

Figure 7:
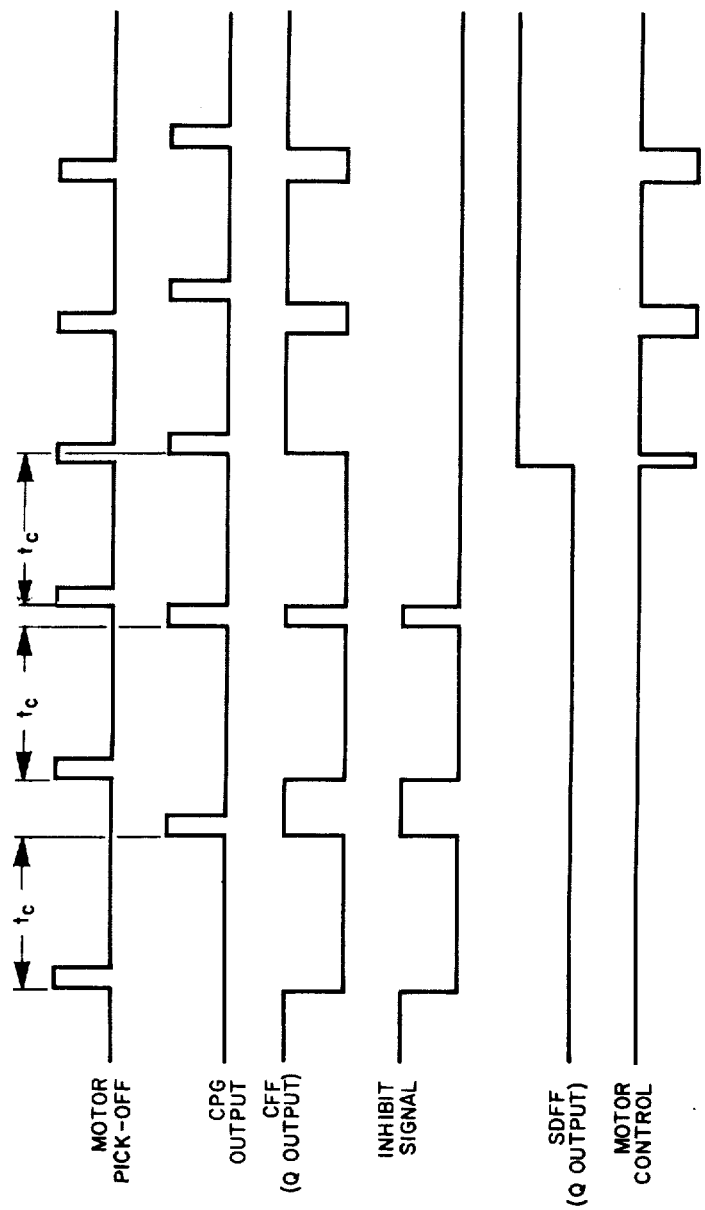
FIG. 7 is a graphical representation of circuit signals as the motor approaches and finally achieves synchronous speed.

FIG. 7 shows the various circuit signals as the motor approaches, and finally achieves synchronous speed. The operation of the circuit is essentially the same as in FIG. 6 during the first three motor pick-off pulses, although the decreasing intervals between them indicate that the motor is speeding up. Finally, the interval between the third and fourth motor pick-off pulse is slightly less than $t_c$. At the leading edge of the fourth motor pick-off pulse, the D input to flip-flop 46 is still ONE and the flip-flop 46 is *set*. This is the signal that tells the circuit that the motor has achieved synchronous speed. The motor control signal is now identical to the output of control flip-flop 44 (CFF) and phase locked operation proceeds as it did in the simplified circuit of FIG. 1. The SDFF 46 is now being clocked by the CPG 42 through AND gate G1, and CR gate G3. This is required for detection of synchronous dropout and detection of overspeed discussed below.

Figure 8:
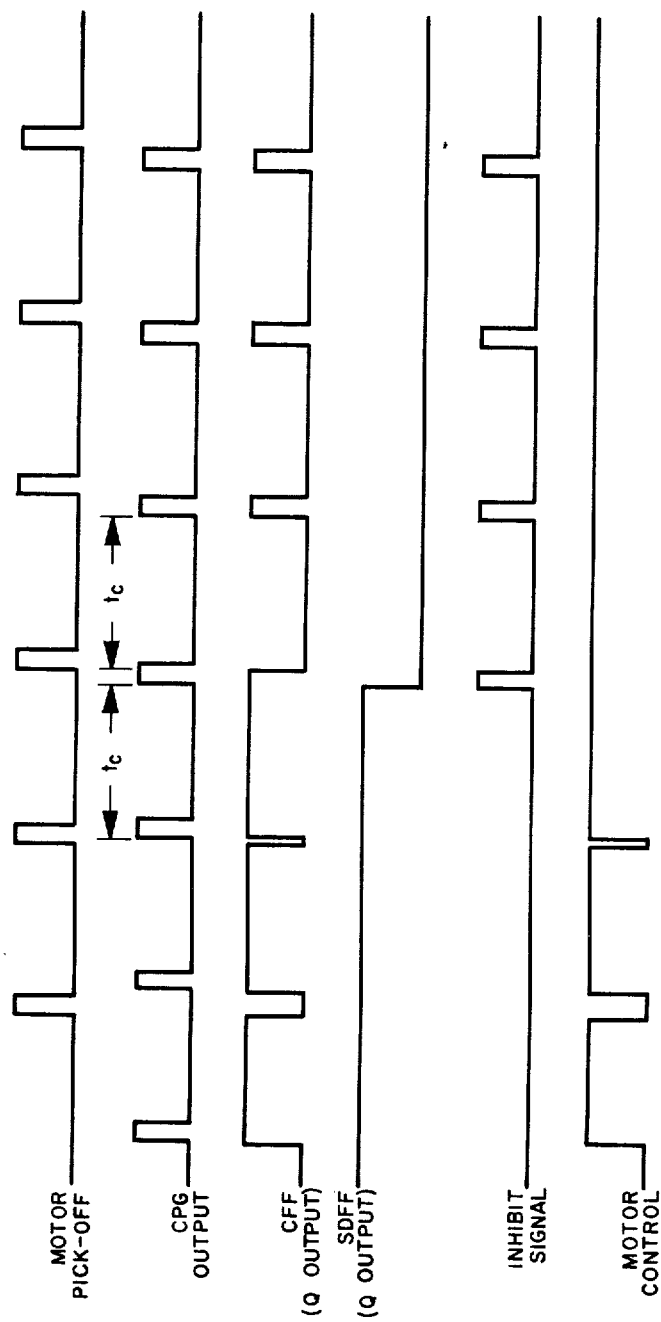
FIG. 8 is a graphical representation of circuit signals showing the motor slowing down and dropping below synchronous speed.

FIG. 8 shows the motor initially phase locked but slowing down. The circuit interprets synchronous dropout as the occurrence of two clock pulses during the interval between two motor pick-off pulses, as is seen to occur between the second and third motor pick-off pulse. The SDFF 46 is reset at the leading edge of the fourth clock pulse. The motor control signal is then held in the ONE state and full power is applied to the motor. Operation then proceeds as in FIG. 6. The logical occurrence which causes synchronous dropout to be detected is the CFF 44 in a ONE or SET state at the leading edge of the CPG 42 pulse if the SDFF 46 is also in a ONE state.

Figure 9:
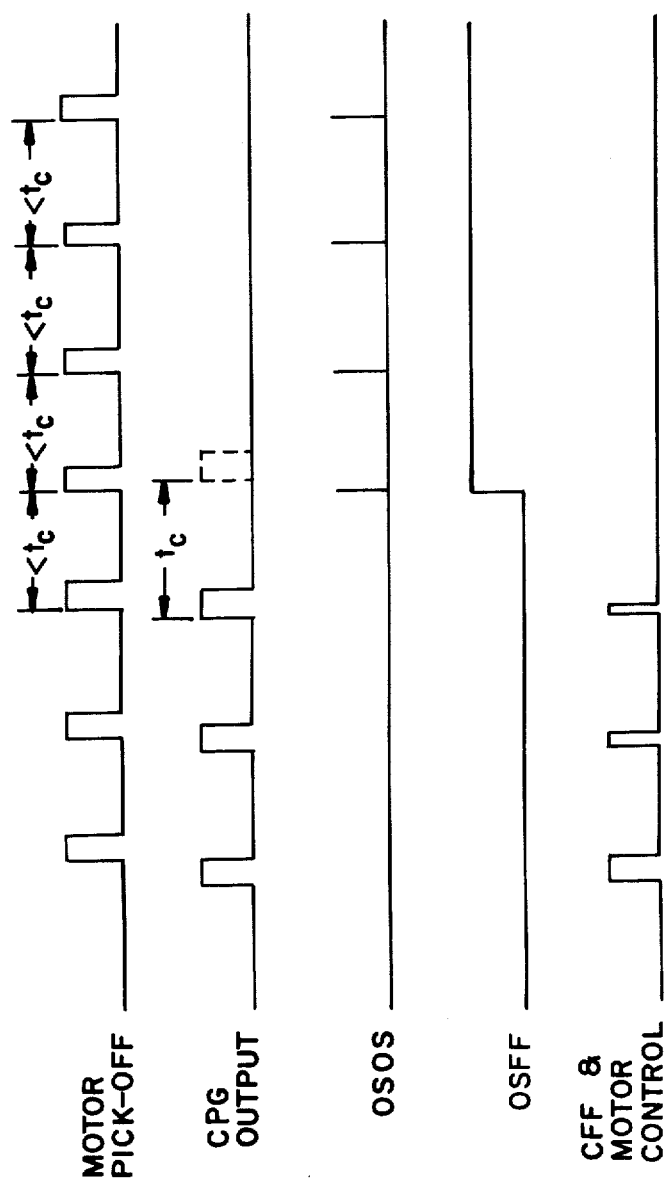
FIG. 9 is a graphical representation of circuit signals showing overspeed detection.

FIG. 9 explains the overspeed detection. As in FIG. 8, the motor is initially phase locked but this time the motor speed is increasing. The circuit detects overspeed when two consecutive motor pick-off pulses occur during the interval between two clock pulses. This is sensed logically at the leading edge of a motor pick-off pulse if the CFF 44 is in a ZERO state and if the SDFF 46 is in a ONE state. In FIG. 9 this is seen to occur at the leading edge of the fourth motor pick-off pulse. The fourth CPG pulse is shown in dashed lines where it would have occurred if the circuit action did not suppress it. When the OSFF 48 is *set* at the fourth motor pick-off pulse the overspeed one-shot (OSOS) 43 is immediately triggered through G8 (FIG. 4) and outputs a very narrow pulse. This pulse inhibits the CPG through G9, and as discussed earlier with respect to FIG. 5 the CPG 42 cannot output another pulse until a time $t_c$ after the pulse from overspeed one-shot 43. This, however, does not happen because the motor pick-off pulses are occurring at intervals less than $t_c$, and they keep triggering the OSOS 43. Since the CPG 42 is suppressed during overspeed, the control flip-flop 44 can never be *set*. The SDFF 46 which was set during the phase lock mode can not be *reset* by the CPG 42 through G1 and G3 (FIG. 4) either. Therefore the output of G5, or motor control is held at a ZERO during overspeed shutting off all power to the motor and causing it to slow down.

Figure 10:
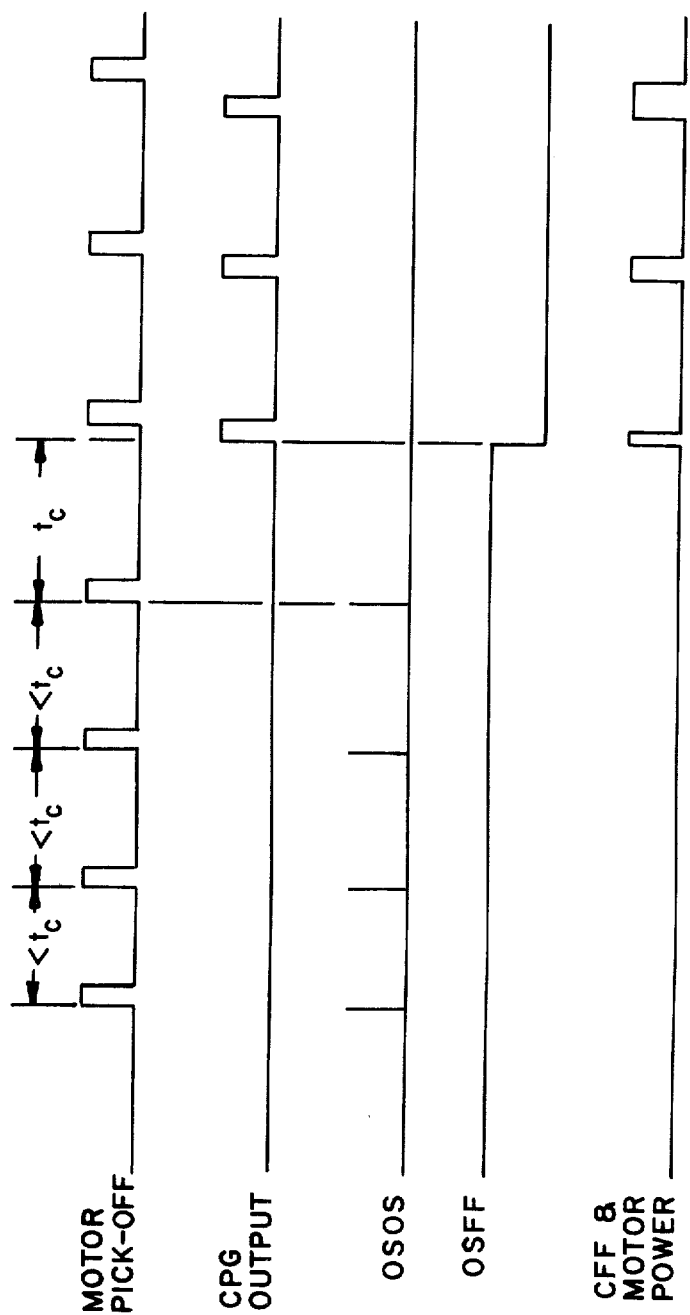
FIG. 10 is a graphical representation of circuit signals showing the motor slowing from overspeed to synchronous speed.

Finally FIG. 10 shows how the circuit establishes phase lock as it slows down from overspeed. In FIG. 10 the motor pick-off pulses are shown initially occurring at intervals less than $t_c$. The CPG 42 is suppressed, the OSOS 43 is outputing pulses at each motor pick-off pulse and the OSFF 48 is *set*. When the interval between motor pick-off pulses becomes slightly greater than $t_c$ the OSOS 43 fails to inhibit the CPG in time to suppress its output. The first pulse from the CPG 42 *resets* the OSFF through its $C_D$ input (FIG. 4) thus preventing the motor pick-off pulses from triggering the OSOS 43 through G8. The phase locked mode is now reestablished and proceeds as in FIG. 2.

The circuit shown in FIG. 4 is a logical and simple method of controlling a DC motor in a phase locked servo loop. It provides the fastest possible way of bringing the motor up to synchronous speed, and it allows no harmonic or subharmonic speed lock-ins. The implementation of the FIG. 4 system is straightforward with electronic components which are commercially available. Needless to say the circuit could be implemented in a large variety of ways.

What is claimed is:

1. A phase locked servo control system loop for changing the speed of a direct current motor operating under varying load conditions to maintain a constant predetermined motor speed comprising:

reference pulse means for providing a first control signal of a series of successive pulses having a substantially fixed repetition rate in accordance with a predetermined desired operation of said motor;

speed responsive means operatively connected to sense the speed of said motor for providing a second control signal output of successive electrical pulses having a repetition rate proportional to actual rotation of said motor;

pulse responsive means electrically coupled to receive successive pulses from said reference pulse means and said speed responsive means for providing a train of output pulses of varying pulse width having a pulse width time duration dependent on the phase difference between individual successive pulses of first control signals generated by said reference pulse means and individual successive pulses of second control signals generated by said speed responsive source;

detector means operatively coupled to said pulse responsive means and to gating control means for supplying a pulsed output control signal whenever the time interval between each second control signal pulse is less than the time interval between each first control signal pulse;

coincidence means having inputs electrically coupled to receive output signals from said pulse responsive means and said detector means for producing an output in response to identical output signals;

overspeed responsive means coupled to receive signals from said coincidence means and said speed responsive means for supplying output pulse signals in response to said motor overspeed;

control logic circuit means coupled to accept output pulse signals from said overspeed responsive means for preventing said reference pulse means first control signals from being received by said pulse responsive means; and switching means operatively connected to receive an electrical output from said pulse responsive means for supplying current to said motor in response to the time duration of the pulses for maintaining the rotation of the motor at its predetermined desired operation.

thereby causing the switching means from supplying current to the motor until such time as the motor speed decreases to cause said second control signal pulse to occur at the same time as said first control signal pulse at which time the predetermined desired operation of said motor is reached.

2. The phase locked servo control system of claim 6 in addition comprising;

said detector means being operatively coupled to said pulse responsive means for generating control signal output whenever the time interval between each second control signal pulse is greater than the time interval between each first control signal pulse; and first and second coincidence gate means responsive to outputs from said detector means and said pulse responsive means for providing an inhibit control signal from said first coincidence gate means to stop first control signals from outputting from said reference pulse means and a energizing control signal from said second coincidence gate means for said switch control means to supply current for increasing the speed of said motor to cause said second control signal pulse to occur at the same time as said first control signal pulse at which the predetermined desired operation of said motor is reached;

thus, providing motor speed to lock on only the frequency of the reference pulse means first control signal repetition rate.

3. The phase locked servo control system of claim 1 wherein said pulse responsive means comprises:

a control bistable multivibrator circuit having a first input operatively connected to said reference pulse means and second input means operatively connected to said speed responsive means for generating a first and second complementary pulse outputs, each pulse output starting on the positive leading edge of each pulse of first control signal received by said first input and ending on said second input receiving the positive leading edge of each pulse of second control signal.

4. The phase locked servo control system of claim 1 wherein said synchronous detector comprises:

a bistable multivibrator having first and second complementary outputs.

* * * * *